C. F. SCHMIDT.
AUTOMOBILE SAFETY LOCK AND EMERGENCY BRAKE.
APPLICATION FILED DEC. 4, 1916.
1,268,772.
Patented June 4, 1918.
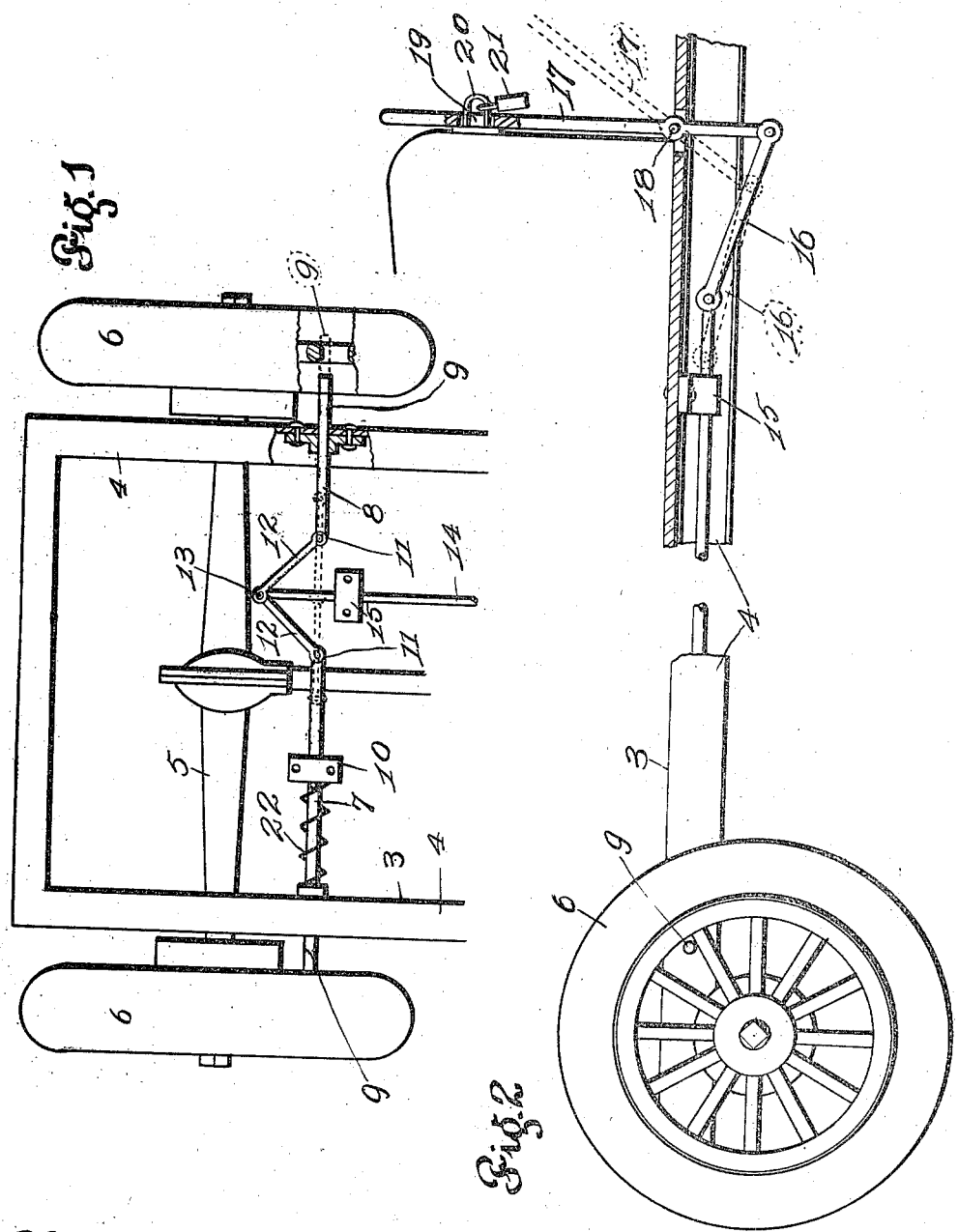
Witnesses
W. C. Stein
B. Austine
Inventor
Chas. F. Schmidt
by Alfred A. Eicks Atty

UNITED STATES PATENT OFFICE.

CHARLES F. SCHMIDT, OF ST. LOUIS, MISSOURI.

AUTOMOBILE SAFETY-LOCK AND EMERGENCY-BRAKE.

1,268,772.  Specification of Letters Patent.  Patented June 4, 1918.

Application filed December 4, 1916. Serial No. 134,966.

*To all whom it may concern:*

Be it known that I, CHARLES F. SCHMIDT, a citizen of the United States, and resident of St. Louis, Missouri, have invented certain new and useful Improvements in Automobile Safety-Locks and Emergency-Brakes, of which the following is a specification.

This invention relates to improvements in automobile safety locks and emergency brakes, and has for its object a lever mechanism located beneath the body and in proper relation with the chassis, and by the manipulation of a lever in close proximity with the seat for manipulating the machine advancing arms into the drive wheels between the spokes.

A further object of my invention is to provide a mechanism in close proximity with the rear axle and manipulated from the front end of the machine for projecting arms between the spokes so as to lock the machine and prevent the machine from being stolen when left at a siding and also the device may be manipulated to stop the machine in extreme emergencies.

Figure 1, is a top plan view of the chassis and rear running gear showing the application of my improvement.

Fig. 2, is a central sectional view showing the location of the mechanism and its operating lever relative to the seat.

In carrying out my invention and referring to the drawing in detail 3 indicates the chassis on the ordinary automobile. The frame is composed preferably of angle or channel bars 4; to this frame is attached and properly located the rear axle 5 to which are mounted the traction wheels 6, this being of the ordinary structure.

At a point convenient with the rear portion of the truck I support my improvement which consists of a pair of rods 7 and 8, projecting through and operating in openings formed in the frame or channel or angle bars 4; their free ends 9 being normally in a position close to the spokes yet preventing contact therewith while the wheels are in motion. The bars are supported in hangers 10 conveniently located and to the opposite ends 11 of these rods is attached a fulcrum 12, which consists of a pair of arms pivoted together at the point indicated by the numeral 13 and to this pivot joint is attached an operating rod 14 which is supported in suitable hangers 15, and said rod extending forwardly to the front part of the machine and pivotally attached to a connecting rod 16 which in turn is connected to a hand operating lever 17.

The lever 17 is pivoted to the frame or body of the car at the point indicated by the numeral 18 and its upper end is provided with an elongated slot 19 which is designed to fit over a staple, eye bolt, or perforated projection 20, and through the eye of the projection is adapted to be placed a pad-lock 21, or any other suitable locking device which might be found most desirable.

The lever 17 which is placed in a vertical or locked position as shown in Fig. 2 will bring the fulcrum 12 in approximately a horizontal position advancing the rods 7 and 8 so that the ends 9 will project between the spokes thus locking the wheels and preventing them from turning, thus forming a safeguard which prevents the machine from being stolen while on a siding.

When the lever is unlocked it is thrown forward so that the fulcrum will assume the position as shown in Fig. 1, and in order to prevent vibration during the movement of the machine I place at a convenient location on one of the rods 7 a spring 22 which will hold the device in an unlocked position.

In addition to the locking feature to prevent the theft of the machine it may be used as an emergency brake whenever such case presents itself.

The device is simple in construction and can be arranged to be attached to any standard automobile with little expense and without in any way interfering with the general mechanism of the car.

Having fully described my invention what I claim is:

An automobile safety lock and emergency brake comprising a hand operating lever pivotally mounted to the floor of an automobile body, an operating rod slidably mounted in bearings secured to the underside of the automobile body, a connecting rod connecting one end of the operating rod to the lower projecting end of the hand operating lever, a pair of toggle arms connected to the rear end of the operating rod, a pair of locking rods connected to the ends of the toggle arms and being supported in bearings attached to the automobile frame, a spring located on one of the locking rods for returning the locking rods to their normal position when the same is released, the locking rods being placed in a position so as to permit the free ends to be advanced between the spokes of the wheel and near the arm, substantially as specified.

In testimony whereof, I have signed my name to this specification, in presence of two subscribing witnesses.

CHARLES F. SCHMIDT.

Witnesses:
 ALFRED A. EICKS,
 WALTER C. STEIN.